Nov. 27, 1945.   G. M. GIANNINI   2,389,664
MAGNETIC COMPASS
Filed Aug. 20, 1943   2 Sheets-Sheet 1
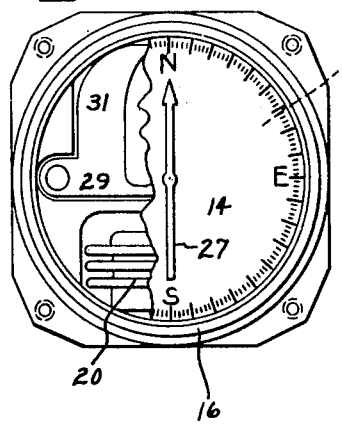
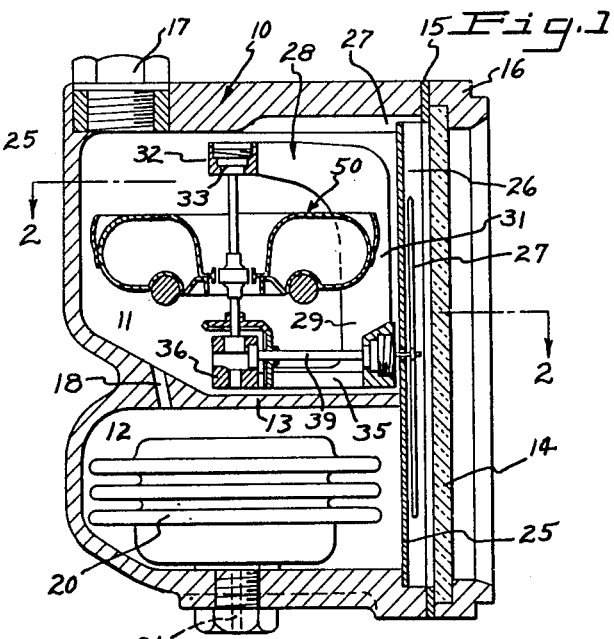
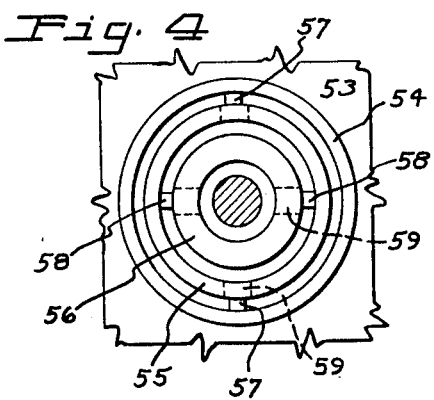
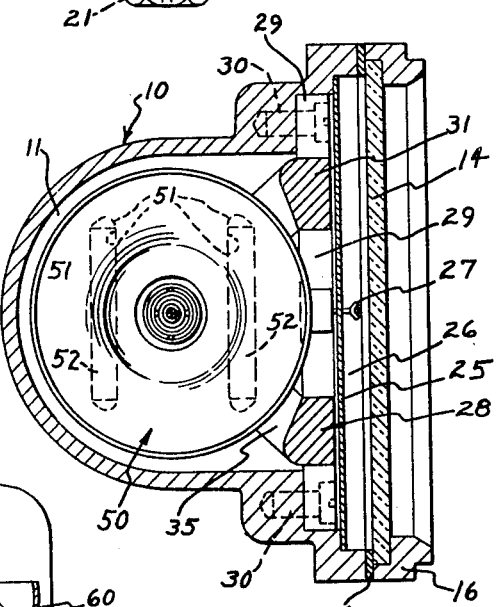
Inventor
Gabriel M. Giannini Nov. 27, 1945.   G. M. GIANNINI   2,389,664
MAGNETIC COMPASS
Filed Aug. 20, 1943    2 Sheets-Sheet 2

Inventor
Gabriel M. Giannini
By
Batcheler & Seautlebury
Attys.

Patented Nov. 27, 1945

2,389,664

UNITED STATES PATENT OFFICE 2,389,664

MAGNETIC COMPASS

Gabriel M. Giannini, West Los Angeles, Calif., assignor, by mesne assignments, to A. S. Howe, Jr., South Norwalk, Conn.

Application August 20, 1943, Serial No. 499,347

11 Claims. (Cl. 33—223)

This invention has reference to magnetic compasses, and more particularly, although not limitedly, to those of the type known as direction indicators which use a relatively fixed dial and a pointer connected with the movable magnetic element. Certain features of the invention are applicable generally to magnetic compasses; certain other features relate more particularly to the direction indicator type.

Numerous types of liquid filled compasses have been used, but as far as known all of these employ pendulous magnetic systems swinging from a point support. Some of these magnetic systems, or "cards" as they are generally known, are supplied with a float element to relieve the pivot support of a part of the weight. But as far as known, in any of these systems where the center of mass of the card is either at or below the suspension center, the magnetic system is unduly affected by lateral accelerations and is caused to sway or swing out of its proper horizontal position. And as soon as magnets are out of horizontal position they are affected by the vertical component of the earth's magnetic field, introducing distortion and consequent error in reading.

One of the main objects of the present invention is to produce a magnetic compass or direction indicator in which the effect of lateral acceleration is reduced to a minimum, and which, therefore, is peculiarly useful in aircraft, where it may be installed even in parts of the aircraft remote from the center of gravity without being subject to the large errors commonly inherent in ordinary compasses. These errors induced by lateral acceleration occur particularly when the airplane is longitudinally unstable and affected by yaw, or when in banking the instrument is affected by radial accelerations. In the present invention relative freedom from the effect of lateral accelerations is attained by an arrangement of the parts of the magnetic system with relation to the point of support in a buoyant fluid so that the system as a whole has a minimum dynamic unbalance with relation to lateral forces of acceleration.

The invention also provides a design, mounting and intercoupling of the movable operating parts such that the instrument combines a short period of rotational oscillation with a low value of over-swing and a low value of swirling movement, over a wide temperature range. These operating characteristics of the instrument are obtained by utilizing a fluid immersed magnetic system of low mass and of small diameter, and with a high magnetic moment, together with a relatively low rotational drag but a high value of damping. The high damping value is obtained with a minimum amount of moving mass and without increasing the swirl rotation, by utilizing the coupled pointer in a separate liquid filled chamber as a damping element. The pointer rotates in a narrow liquid filled chamber in such relation to the chamber walls (the front glass and the dial of the present preferred instrument) as to generate a high damping action accompanied by little drag. The definitely and positively coupled pointer thus functions, in the present preferred design, both as a direction indicator and as a coupled but independent damping element. In both these functions, but particularly in the latter, the definite and positive coupling of the element to the magnetic system is important. And in certain aspects of the invention that element may be looked at simply as a damping element, with its indicator function either omitted or performed by some other element or system.

It is also a feature of the invention that the coupled indicator pointer, arranged to swing in a vertical plane and, with "North" at the top of the dial, can be read in the conventional manner of a map. The arrangement is such that the indicating pointer swings to the right as a right turn is made, so that "East" on the dial is in its conventional position to the right.

Other objects and corresponding features of the invention will appear from the following detailed description. For the purpose of describing the invention by way of typical and illustrative designs, reference is made to the accompanying drawings in which Fig. 1 is a vertical central section of a preferred form of instrument;

Fig. 2 is a horizontal section taken as indicated by line 2—2 on Fig. 1;

Fig. 3 is an enlargement, in central vertical section, of certain of the operating parts shown in Fig. 1;

Fig. 4 is a further enlarged detail fragmentary section taken as indicated by line 4—4 on Fig. 3;

Fig. 5 is a reduced scale front elevation of the instrument, with parts broken away to facilitate illustration;

Figure 6:
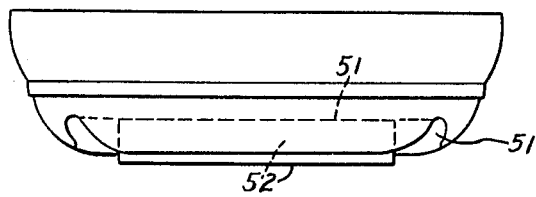
Fig. 6 is a detail elevation taken as indicated by line 6—6 of Fig. 3.

In the illustrative design shown in the drawings, a suitable casing is provided, such as that indicated generally by the numeral 10, divided into an upper chamber 11 and a lower chamber 12 by an intermediate casing wall 13. The otherwise open front of the casing is closed by a front glass 14, secured against a gasket 15 by front ring 16, which is secured to the main casing by screws or other means. The housing is provided with a filler cap 17 which gives access to the upper part of the upper chamber, and a vent at 18 in the intermediate partition 13 provides communication between the two chambers. Both chambers, and the restricted space in which the indicator pointer operates as afterwards described, are filled with oil or other suitable compass liquid, and filler cap 17 not only facilitates filling but also the removal of any air or other gas from the interior of the housing.

Lower chamber 12 is provided with an expansive chamber such as conventional Sylphon bellows 20 whose interior is in atmospheric communication through vent 21. Contraction and expansion of the bellows has the effect of maintaining the chambers of the instrument constantly full of liquid without vaporous or gaseous bubbles and of maintaining a substantially constant pressure on the liquid throughout the expansions and contractions attendant changes of temperature through the operating temperature range.

The dial 25 is here shown as of the fixed type, and shows "North" at the top, "East" at the right, "West" at the left, and "South" at the bottom. This arrangement, as has been noted, provides a practical and direct reference to any chart or map without the necessity of reading either the compass or the chart in any position but the conventional one in which North is at the upper side. The dial is mounted in casing 10 directly behind front glass 14, with a relatively narrow pointer chamber 26 between the dial and glass. In the upper part of the casing a passage 27 is provided for liquid communication between the main chambers and the pointer chamber.

Upper chamber 11 houses the moving parts of the mechanism, excepting pointer 27. All of the moving parts of the mechanism are mounted upon a rigid cast frame 28 which is preferably of the design shown in the drawings. This mounting frame is made as a separate piece and of such size and rigidity as to provide a mounting for the several operating parts such that no vibration and none of the usual exigencies encountered in service can throw the operating parts out of proper alinement. As shown in the drawings frame 28 comprises a horizontally extending base member 29 which is secured at its end in the casing by screws 30. Near the ends of base member 29 there are two upstanding legs 31 which turn horizontally at their upper ends and converge at the boss 32 which forms the housing for upper bearing 33 of vertical shaft 34. Two convergent frame arms 35 also extend from base 29 and convergently unite at a lower frame boss 36 which houses lower bearing 37 of vertical shaft 34 and the inner bearing 38 of horizontal pointer shaft 39. The outer or forward bearing 40 of the pointer shaft is carried by base member 29. The forward end of pointer shaft 39 extends, with clearance, through dial 25 and carries the small light pointer 27 at its forward end. All of the shaft bearings are jewelled to minimize frictional losses. The details of the bearings need not be illustrated or described, as they may be conventional. The pointer 27 is in itself statically balanced; it need not be dynamically balanced as its mass is a very small part of the total moving mass of the operating parts.

The two shafts 34 and 39 are rotatively interconnected by the bevel gears 41, in such relation that relative turning of the instrument case in a direction from north alinement toward east (righthandedly, looking down on the case) will cause the pointer to move in a direction from "North" toward "East."

The present preferred form of the rotating magnetic system is best shown in Fig. 3. Fundamentally, the system consists of a magnet or magnets and a float, mounted upon and coupled with vertical shaft 34 through the medium of any suitable joint which rotatively couples the magnetic system positively to the shaft but allows free swinging movement of the magnetic system relative to the shaft. Any suitable type of flexible coupling may be utilized (as for instance a diaphragm which is vertically flexible but radially and circumferentially rigid), but at present the illustrated gimbal coupling is preferred. The physical make-up of the magnet system—the framing of the magnet or magnets and the float—may take various forms, but the present preferred form is shown in the drawings. In this form the whole system comprises a true solid of revolution, excepting only for the two magnets and their connection with the float. In that preferred form the magnet system consequently generates very little damping action and picks up very little swirl from rotation of the liquid. And while the magnet system may be provided with irregularities or projections for the purpose of creating a substantial amount of rotational damping, it is preferred to make that system in such form as to have substantially no rotational damping effect, other than the drag in the liquid; leaving the damping effect to be performed substantially wholly by the light weight damping element (here, the pointer) which rotates in a plane at right angles to the plane of the magnetic system and in its own independent chamber. Thus, in its present preferred form, the magnetic system includes the float 50 of toroidal form, constructed of any suitable material, as of aluminum or copper. The underside of the float is indented to form two or more straight magnet-receiving channels 51 which lie in chordal relationship to the circular float and in symmetric relationship to the central vertical axis of the float. The two or more magnets 52, preferably of sintered Alnico and highly magnetized, are secured in channels 51 in such relationship to the float that the magnets project none or very little at any point beyond the external surface of the float. See Figs. 3 and 6.

The float has an internal flat flange 53 and an inner integral ring flange 54 which forms the outermost element of the gimbal structure. That structure is here illustrated, but merely typically, as including the ring 54, an intermediate ring 55 (which is shown in elevation in Fig. 3) an inner hub 56 rigidly mounted on vertical shaft 34, and the two sets of pivots 57 and 58. Jewel bearings indicated at 59, preferably may be used for all these pivots. The gimbal axes are preferably located on the north-south and east-west axes. The magnetic system (float and magnets) is balanced (e. g., by proper placement of the magnets on the float) to counterbalance the effect of magnetic dip. If the gimbal axes are placed diagonally to the N-S and E-W axes, the gimbal error which is introduced into the azimuth reading is cumulative with the error introduced by the dip balance.

The magnetic system as typically illustrated in the drawings has characteristics which will now be stated as illustrative of the invention. Fig. 1 is an approximate showing of the typical instrument at twice size. The mass of the float (of copper) is 6 grams; of the magnets 9 grams; of the whole magnetic system 15 grams. These figures include the mass of the damping flange 60, later referred to. The mass can be reduced without reducing the displacement volume by using aluminum instead of copper. The center of suspension, indicated at C. S. in Fig. 3 is at the center of the gimbal and is located below the center of mass or gravity of the system, indicated at C. G.; and the center of buoyancy is located in the relative position shown at C. B., above C. G. In the actual device for which the test results are given later the distance C. S.-C. G. was about .07 inch or 0.178 cm., and the distance C. S.-C. B. was about 0.17 inch or 0.432 cm. Moment of inertia of the system about a heeling axis (tipping about a transverse axis through the center of suspension under the effect of lateral acceleration) was determined at about 22 c g. s. Moment of inertia about the vertical axis was determined at about 42 c. g. s. In heeling under the influence of lateral accelerations the system acts like an inverted pendulum; the displacement volume of the system and the position of C. B. being such that the buoyancy moment in a liquid such as kerosene is greater than the gravity moment about C. S. The displaced volume of the system was determined at about 13.1 cm.$^3$. The small heel is in the direction of the lateral acceleration.

The general consequences of the design which have been explained are that the magnetic system as a whole has a very small heeling response to lateral forces of acceleration, and thus tends at all times to maintain a position in which the magnets are kept in a horizontal plane. The minimization of heeling movement is further augmented by the provision of means in connection with the magnetic system for creating a damping effect which acts selectively to damp pendulous movement. That means may take various forms, for instance either the form shown in Fig. 3 or that shown in Fig. 7. In Fig. 3 an external circular and upwardly projecting flange 60 is attached to the periphery of float 50. When the float tends to swing pendulously one side of the float tends relatively to move up in the surrounding liquid while the other side tends to move down. The action of the projecting flange, most effective at those peripheral points which are furthest removed from the horizontal axis of tipping, is to move a considerable mass of liquid up and down along with the correspondingly moving parts of the float. In thus, so to speak, picking up the mass of liquid, the tendency of the float to pendulous swinging is highly damped. At the same time, the circular flange 60 does not otherwise materially alter the described characteristics of the float with relation to relative rotational movement about the vertical axis.

Figure 7:
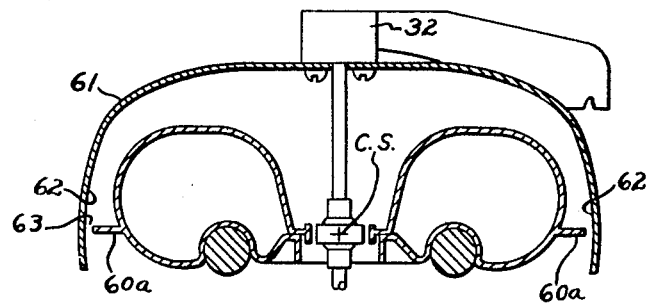
Fig. 7 is a vertical section of operating parts of the instrument similar to Fig. 3, but showing a modified design.

In Fig. 7 the float 50 is shown without any flange 60, but rather with a radially projecting circular flange 60a located in the horizontal plane of center C. S. of the gimbal joint—the center about which the float swings. The outer edge of this flange approaches closely to a stationary hood 61 which hangs over and around the float, conveniently supported from the upper bearing boss 32. The portions 62 of the hood wall within which flange 60a will play in any normal heeling movement may preferably be substantially spheric. The small clearance 63 at the outer edge of flange 61a causes a high damping effect, due to the inertia of the mass of liquid enclosed in the hood and to the resultant velocity of liquid movement past the edge of the flange whenever the flange tends to swing in the hood. Like the form shown in Fig. 3, this form shown in Fig. 6 utilizes the inertia of a mass of liquid to damp heeling movement.

Rotational damping action of pointer 27 in its relatively confined chamber 26 is also due to the mass of the liquid in that chamber and to enforced flow of the liquid at considerable velocity past the moving pointer. In the illustrative instrument here described, the desired relatively high damping effect is attained with a pointer and a chamber of about the relative dimensions shown, the pointer being approximately .01″ thick, and the width dimension of chamber 26 being approximately .062 in. The amount of damping effect may be easily adjusted by varying the relative thicknesses of the pointer and its chamber, or by changing either the thickness or the cross-sectional shape of the pointer, in a chamber of any given width dimension. Thus, for instance in Fig. 2 the pointer is shown as having an angular cross-section which increases its effective thickness to say 0.1 inch without proportionally increasing its mass. The damping which is obtained in this manner by utilizing the pointer is, in effect, of an entirely different nature from the damping obtained by over-all friction of a large surface immersed in fluid, as in the case of a conventional compass, or as would be the case here if the frictional effect of the magnetic system, or of any damping appurtenances applied to that system, were relied on for damping. In any such case a large damping effect requires a proportionately large surface and consequently a proportionately large mass. It is one of the constituent features of my invention that the mass of the rotating parts and the rotating moment of inertia are kept small. Utilizing the pointer in its narrow chamber as the source of damping effect enables me to provide as large an effect as is desired but with a very small rotating mass.

Furthermore the utilization of the coupled but independent damping element (pointer) in its own independent chamber, and in a plane non-parallel to the plane of the magnetic system, has an important bearing on minimization of swirl as well as drag. If the damping effect were attained by means directly on the magnetic system, or by a liquid-immersed means rotating in a parallel plane, the drag would be increased and the swirl (the rotation picked up by the magnetic system from the case and liquid rotating around it) would be increased in direct proportion to both the drag and the damping; making it impossible or impracticable to have both low drag and swirl and high damping. The present arrangement produces the desired high damping, not only with low mass and inertia, but also with low drag and horizontal swirl effects. These factors result in the short period and low overswing and swirling movements which characterize the instrument.

The general characteristics and the advantageous features of my invention will be understood from what has now been said. The extent to which the desirable characteristics and features are reached by the illustrated form of the present invention is shown by the following recapitulations of extended tests made with an instrument of the type shown in the drawings and of the characteristics previously indicated. In the instrumental tests the horizontal magnetic field was approximately 0.18 gauss, and the vertical approximately 0.54 gauss. The tests were conducted at a temperature of 20° C. and at 1000 millibars pressure, and were carried out by repeating readings for right and left, and without tapping the instrument unless specified.

(1) Period of swing, not more than 2.5 sec. and not less than 1.5 sec. This test was performed by magnetically deflecting the pointer 30° and measuring the time necessary for the pointer to swing from 30° displacement back to 5° displacement from its original reading.

(2) Over swing; less than 1°. This test was performed by magnetically deflecting the pointer 30° and by measuring the return over travel of the pointer with respect to its original reading.

(3) Swirl effect less than 1°. This test was performed by rotating the whole instrument through 90° in 3 sec. or 30° per sec., and measuring the over-travel of the pointer with respect to its original reading.

(4) Frictional drag; ½° with tapping, 2° without tapping. This test was performed by magnetically deflecting the desired 5° and measuring the angle by which the pointer falls short of its original reading on return travel.

(5) Vibration test; pointer error during vibration less than 2°. This test was performed by vibrating the instrument for 4 hrs. at 600 or 2400 cycles per sec., so that one point of the housing described a circle $\tfrac{1}{32}$ in. in diameter along a plane inclined 45° to the horizontal. At the end of the vibration test no increase of frictional effect was observed.

(6) Heeling test; reading error less than 3° at 10° of heel.

Further general test results of the instrument have indicated that its action is very uniform through wide ranges of temperatures and atmospheric pressure, such as those encountered in the extremes of aircraft flight. The instrument has substantially no parallax. Repeated tests under actual flying conditions have shown that the inaccuracy of reading when the instrument has been subjected to high lateral acceleration, is very small and, for most purposes, negligible.

The performance data which has been given, specifically relates to the system on which definite dimensional data has been given. That data, however, is only typical and the performance results may be bettered by some slight variations.

Various other uses of, and other changes in or additions to, the instrument may be made within the scope of the invention as indicated herein and as defined in the following claims. For instance it is contemplated that the instrument may be additionally provided with a magnetic compensator, and with a settable course indicator, but such adjuncts are not here described as they do not enter into the present invention.

As illustrative of other uses I may mention the use of the described type of floating stabilized system for the stabilization of elements or devices other than compass magnets. Viewed as a stabilizing system, the unit may be described as comprising a buoyant element or unit whose center of mass is below its center of buoyancy, the center of suspension being below the center of mass. In the particular form which has been described, the location of the relatively dense magnets below the center of the float results in the desired relation of the centers of buoyancy and mass. Viewed merely as a stabilizer the magnets have only the function of relatively displacing, downwardly, the center of mass. That relative displacement can be caused by any appropriate weighting of the float, either by attaching weight or by so shaping the float itself that its center of mass is below its center of buoyancy. For instance a hollow float of uniform wall thickness and of inverted conical or pear-shaped form has the desired relation between the two centers.

It will be understood that in speaking of shaft 34 as being vertical or normally vertical, I mean that the shaft (the casing) will usually be mounted on an aircraft or ship, etc., in such relative position that the shaft will be vertical with reference to the craft and therefore vertical when the craft is in level position. And it will also be understood that "center of suspension" as used here means a center or inverted suspension in the immersion liquid.

I claim:

1. In magnetic compasses of the liquid immersed type which include a rotatable magnetic system and an enclosing liquid containing case in which the magnetic system is rotatably mounted, the improvement which is characterized by a partition dividing the case interior into two chambers, a normally vertical mounting shaft rotatably journalled on an axis fixed in one chamber, means whereby the magnetic system is supported on said shaft and connected to said shaft with regard to rotational movement, a damping shaft positively rotatably coupled with the mounting shaft, journalled in the case on a normally horizontal axis and projecting into the other of the two chambers, and a rotatable liquid-immersed damping element mounted on the damping shaft in said other chamber.

2. Improvement in magnetic compasses as specified in claim 1, further characterized by the damping element being in the form of a radially extending vane and the walls of its chamber being parallel to the plane of its rotation and closely confining it in an axial direction.

3. In magnetic compasses of the liquid immersed type which include a rotatable magnetic system and an enclosing liquid containing case in which the magnetic system is rotatably mounted, the improvement which is characterized by the provision of a normally vertical mounting shaft rotatably journalled on an axis fixed in the case, means whereby the magnetic system is connected to said shaft to rotate with the shaft about the shaft axis, a damping shaft journalled on an axis fixed in the case in distinctly non-parallel relation to the mounting shaft and coupled for rotation by the mounting shaft, and a liquid-immersed rotatable damping element fixed on the damping shaft to rotate with the damping shaft about that shaft's axis.

4. Improvement in magnetic compasses as specified in claim 3, further characterized by the magnetic system having an external liquid-contacting surface which is substantially a surface of revolution about the axis of the mounting shaft.

5. Improvement in magnetic compasses as specified in claim 3, and in which the axis of the damping shaft is normally horizontal.

6. Improvement in magnetic compasses as specified in claim 3, and in which the axis of the damping shaft is normally horizontal, and in which damping element comprises a direction indicator pointer.

7. Improvement in magnetic compasses as specified in claim 1, further characterized by the damping element being in the form of a radially extending vane and the walls of its chamber being parallel to the plane of its rotation and closely confining it in an axial direction, said vane constituting a direction indicator and one of the walls of its chamber constituting an indexed dial.

8. In magnetic compasses of the liquid immersed type which include a rotatable magnetic system and an enclosing liquid filled case in which the magnetic system is rotatably mounted, the improvement which is characterized by the provision of means restraining the magnetic system to rotation about an axis which is normally vertical, the normal rotation of the system being in a horizontal plane, a liquid-immersed damping element mounted in the case to rotate about an axis which normally has a large horizontal component of direction, the damping element rotating in a plane which makes at least a major acute angle with the normal rotational plane of the magnetic element, and rotational coupling between the magnetic and damping elements, the magnetic system having an external liquid-contacting surface which is substantially a surface of revolution about the axis of rotation of the system, the rotational inertia of the damping element being low as compared with that of the magnetic system, and the damping element being of such external configuration as to have a relatively high drag and to generate a substantial damping in the immersing liquid.

9. In magnetic compasses which include a rotatable magnetic system and a supporting frame, the combination of a normally vertical mounting shaft rotatably journalled on an axis fixed in the frame, means whereby the magnetic system is supported on said shaft and connected to said shaft with regard to rotational movement, a casing associated with the frame and forming a liquid containing chamber in non-enclosing relation to the magnetic system, a damping shaft positively rotatively coupled with the mounting shaft, journalled in the frame on an axis fixed with reference to the frame in distinctly non-parallel relation to the mounting shaft and projecting into said liquid containing chamber, and a rotatable liquid-immersed damping element mounted on the damping shaft in said chamber.

10. In magnetic compasses, the combination as specified in claim 9, and in which the damping shaft axis is normally horizontal.

11. In magnetic compasses, the combination as specified in claim 9, and in which the damping element is in the form of a radially extending vane and the walls of the chamber are parallel to the plane of vane rotation and closely confine it in an axial direction.

GABRIEL M. GIANNINI.